United States Patent
Griot et al.

(10) Patent No.: US 10,149,248 B2
(45) Date of Patent: Dec. 4, 2018

(54) REPORTING DEVICE STATISTICS IN WIRELESS COMMUNICATIONS

(71) Applicant: QUALCOMM Incorporated, San Diego, CA (US)

(72) Inventors: Miguel Griot, La Jolla, CA (US); Haris Zisimopoulos, London (GB); Jun Wang, Poway, CA (US)

(73) Assignee: Qualcomm Incorporated, San Diego, CA (US)

(*) Notice: Subject to any disclaimer, the term of this patent is extended or adjusted under 35 U.S.C. 154(b) by 476 days.

(21) Appl. No.: 14/673,508

(22) Filed: Mar. 30, 2015

(65) Prior Publication Data

US 2015/0327248 A1    Nov. 12, 2015

Related U.S. Application Data

(60) Provisional application No. 61/992,067, filed on May 12, 2014.

(51) Int. Cl.
| | |
|---|---|
| *H04W 24/08* | (2009.01) |
| *H04W 52/02* | (2009.01) |
| *H04W 72/04* | (2009.01) |
| *H04W 72/08* | (2009.01) |
| *H04W 76/27* | (2018.01) |

(Continued)

(52) U.S. Cl.
CPC ....... *H04W 52/0258* (2013.01); *H04W 24/08* (2013.01); *H04W 72/0413* (2013.01); *H04W 72/085* (2013.01); *H04W 76/27* (2018.02); *H04W 88/18* (2013.01); *H04W 92/12* (2013.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01);

(Continued)

(58) Field of Classification Search
CPC .................................................. H04W 72/085
USPC .......................................................... 370/252
See application file for complete search history.

(56) References Cited

U.S. PATENT DOCUMENTS

| | | | | |
|---|---|---|---|---|
| 2010/0120429 A1* | 5/2010 | Kazmi | ............. | H04W 36/30 455/436 |
| 2013/0155928 A1* | 6/2013 | Yu | ............. | H04W 52/0216 370/311 |

(Continued)

OTHER PUBLICATIONS (3GPP TSG-RAN WG3 Meeting #83bis San Jose del Cabo, Mexico, Mar. 31-Apr. 4, 2014; R3-140746).*

(Continued)

*Primary Examiner* — Derrick W Ferris
*Assistant Examiner* — Abdeltif Ajid
(74) *Attorney, Agent, or Firm* — Arent Fox, LLP and Qualcomm, Incorporated (57) ABSTRACT

Aspects described herein relate to reporting user equipment (UE) activity period statistics. Statistics for a UE regarding a time the UE is in a connected mode or idle mode during one or more activity periods can be determined. From the statistics for the UE, it can also be determined whether the time the UE is in the connected mode in the one or more activity periods is less than a threshold. At least a portion of the statistics for the UE can be provided to an access network node where the time the UE is in the connected mode in a corresponding portion of the one or more activity periods is less than the threshold.

28 Claims, 7 Drawing Sheets

(51) Int. Cl.
*H04W 88/18* (2009.01)
*H04W 92/12* (2009.01)

(52) U.S. Cl.
CPC .......... *Y02D 70/144* (2018.01); *Y02D 70/146* (2018.01); *Y02D 70/22* (2018.01)

(56) References Cited

U.S. PATENT DOCUMENTS

| | | | | |
|---|---|---|---|---|
| 2015/0282009 | A1* | 10/2015 | Iwai | H04W 24/10 |
| | | | | 455/436 |
| 2015/0319744 | A1* | 11/2015 | Jung | H04W 24/10 |
| | | | | 370/328 |
| 2015/0327167 | A1* | 11/2015 | Ljung | H04W 76/068 |
| | | | | 370/311 |

OTHER PUBLICATIONS

3GPP Draft; R3-140746 CN Assistance Information for ENB Paramterers Tuning, 3rd Generation Partnership Project (3GPP), Mobile Competence Centre; 650, Route Des Lucioles; F-06921 Sophia-Antipolis Ced, vol. RAN WG3, No. San Jose del Cabo, Mexico; Mar. 31, 2014-Apr. 4, 2014, Mar. 30, 2014 (Mar. 30, 2014), 4 Pages, XP050795437, Retrieved from the Internet: URL: http://www.3gpp.org/ftp/Meetings_3GPP_SYNC/RAN3/Docs/.

Alcatel-Lucent Shanghai Bell, et al., "Details of Assistance Information in SDDTE", 3GPP Draft; R3-140777 Assistancesdtte, 3rd Generation Partnership Project (3GPP), Mobile Competence Centre; 650, Route Des Lucioles; F-06921 Sophia-Antipolis Cedex; France, vol. RAN WG3, No. San Jose del Cabo, Mexico; Mar. 31, 2014-Apr. 4, 2014, Mar. 30, 2014 (Mar. 30, 2014), pp. 1-4, XP050795467, Retrieved from the Internet: URL: http://www.3gpp.org/ftp/Meetings_3GPP_SYNC/RAN3/Docs/.

International Search Report and Written Opinion—PCT/US2015/023684—ISA/EPO—Jun. 25, 2015 (145000WO).

Nsn, et al., "Evaluation on CN Assistance Informationfor SDDTE", 3GPP Draft; R2-140653 (CN Assistance Analysis), 3rd Generation Partnership Project (3GPP), Mobile Competence Centre; 650, Route Des Lucioles; F-06921 Sophia-Antipolis Cedex; France, vol. RAN WG2, No. Prague, Czech Republic; Feb. 10, 2014-Feb. 14, 2014, Feb. 9, 2014 (Feb. 9, 2014), 4 Pages, XP050791962, Retrieved from the Internet: URL: http://www.3gpp.org/ftp/Meetings_3GPP_SYNC/RAN2/Docs/.

QUALCOMM, et al., "On Assistance information for eNB parameters setting", 3GPP Draft; S2-142262 S2_103_CN Assist CR to 23.401, 3rd Generation Partnership Project (3GPP), Mobile Competence Centre; 650, Route Des Lucioles; F-06921 Sophia-Antipolis Cedex; France, vol. SA WG2, No. Phoenix, Arizona, USA, May 26, 2014 (May 26, 2014), 18 Pages, XP050836685, Retrieved from the Internet: URL: http://www.3gpp.org/ftp/tsg_sa/WG2_Arch/TSGS2_103_Phoenix/Docs/.

* cited by examiner

REPORTING DEVICE STATISTICS IN WIRELESS COMMUNICATIONS

CLAIM OF PRIORITY UNDER 35 U.S.C. § 119

The present application for patent claims priority to Provisional Application No. 61/992,067 entitled "APPARATUS AND METHOD FOR REPORTING DEVICE STATISTICS IN WIRELESS COMMUNICATIONS" filed May 12, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Such improvements can be applicable to other multi-access technologies and the telecommunication standards that employ these technologies.

User equipment (UE) employ these technologies to communicate with evolved Node Bs (eNB) to access core network components and functionalities. UEs can communicate with the eNBs in a connected (or active) mode over established radio resource control (RRC) resources, or in an idle mode such to receive paging signals from the eNBs in certain time periods to allow for suspending communication resources at the UEs (and thus conserving power) in other time periods. In an example, the eNBs can define an inactivity timer for determining to switch a UE from the connected mode to the idle mode after detecting a period of inactivity of the UE based on expiration of the inactivity timer. A duration for the inactivity timer may be computed based on certain statistics of the UE accumulated by one or more core network components, such as time in a connected and/or idle mode by the UE on the network. These statistics, however, may not be indicative of actual times of activity/ inactivity of the UE, and thus may not always be useful for determining an appropriate inactivity timer duration.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of reporting user equipment (UE) activity period statistics is provided. The method includes determining statistics for a UE regarding a time the UE is in a connected mode or idle mode during one or more activity periods, determining, from the statistics for the UE, whether the time the UE is in the connected mode in the one or more activity periods is less than a threshold, and providing at least a portion of the statistics for the UE to an access network node where the time the UE is in the connected mode in a corresponding portion of the one or more activity periods is less than the threshold.

In another example, an apparatus for reporting UE activity period statistics is provided. The apparatus includes a statistics gathering component configured to determine statistics for a UE regarding a time the UE is in a connected mode or idle mode during one or more activity periods, a connected mode time component configured to determine, from the statistics for the UE, whether the time the UE is in the connected mode in the one or more activity periods is less than a threshold, and a statistics providing component configured to provide at least a portion of the statistics for the UE to an access network node where the time the UE is in the connected mode in a corresponding portion of the one or more activity periods is less than the threshold.

In yet another example, an apparatus for reporting UE activity period statistics is provided. The apparatus includes means for determining statistics for a UE regarding a time the UE is in a connected mode or idle mode during one or more activity periods, means for determining, from the statistics for the UE, whether the time the UE is in the connected mode in the one or more activity periods is less than a threshold, and means for providing at least a portion of the statistics for the UE to an access network node where the time the UE is in the connected mode in a corresponding portion of the one or more activity periods is less than the threshold.

In another example, a computer-readable medium comprising code for reporting UE activity period statistics is provided. The code comprises code for determining statistics for a UE regarding a time the UE is in a connected mode or idle mode during one or more activity periods, code for determining, from the statistics for the UE, whether the time the UE is in the connected mode in the one or more activity periods is less than a threshold, and code for providing at least a portion of the statistics for the UE to an access network node where the time the UE is in the connected mode in a corresponding portion of the one or more activity periods is less than the threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Aspects described herein relate to determining user equipment (UE) statistics to utilize in determining one or more parameters for the UE, where determining the statistics is based at least in part on whether a time the UE is in connected mode, as indicated by the statistics, achieves a threshold. A UE can communicate with a network and/or related network nodes (e.g., an evolved Node B (eNB), etc.) in a connected (or active) mode where radio frequency (RF) resources for communicating with the network are active for transmitting/receiving communications. The UE may also communicate with the network and/or related network nodes in an idle mode where the UE can suspend operation of one or more RF resources for a period of time to conserve power consumption while activating the RF resources in other periods of time to receive certain communications (e.g., paging signals) from the network. When the UE is communicating with a network in connected mode, however, the UE may not always be actively communicating with the network. Thus, a time duration determined of the UE in connected mode without more information may not be an accurate measurement of communication activity for determining certain configuration parameters for the UE (such as a duration for the inactivity timer). For example, when the UE is in connected mode for a long period of time (relative to duration for the inactivity timer), the UE may or may not actually be actively communicating for the entire period of time, and the actual period of inactivity of the UE may be larger than the time not spent in connected mode (e.g., the time in idle mode). In particular, the UE in connected mode may have many periods of inactivity that span less than the inactivity timer duration value, and thus may not be considered as periods of inactivity since the period is not long enough to trigger expiration of the inactivity timer, which would otherwise cause the UE to enter idle mode.

Accordingly, for example, certain statistics related to the UE during a period of a connected and idle mode cycle may be discarded in consideration for determining one or more parameters for the UE where the time in the connected mode achieves a threshold. For example, the threshold can be absolute, relative to a duration for an inactivity timer, relative to a time the UE is in idle mode during the connected and idle mode cycle (e.g., a ratio of connected mode time to idle mode time), etc. When the UE is in connected mode for a time that is less than the threshold, however, this can allow for more accurate analysis of the actual activity/inactivity time of the UE, such that the idle mode can be indicative of the period of inactivity (e.g., along with the duration for the inactivity timer). Thus, in one example, the duration for the inactivity timer for the UE can be determined based at least in part on analyzing the idle mode times for the UE in connected/idle mode cycles where the time in connected mode is less than the threshold (e.g., in addition to a previous duration value for the inactivity timer or other considerations).

Figure 1:
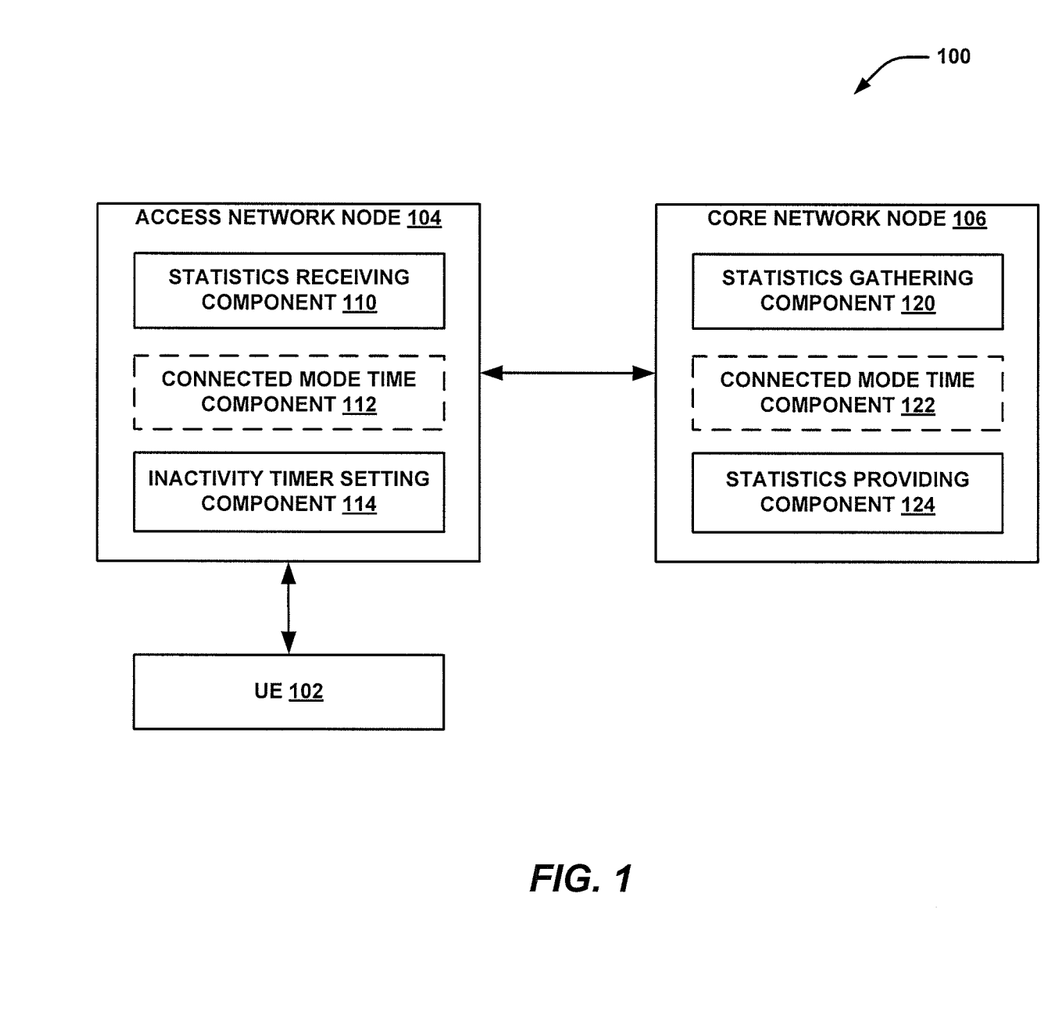
FIG. 1 is a block diagram illustrating an example wireless communications system according to aspects described herein.
Figure 2:
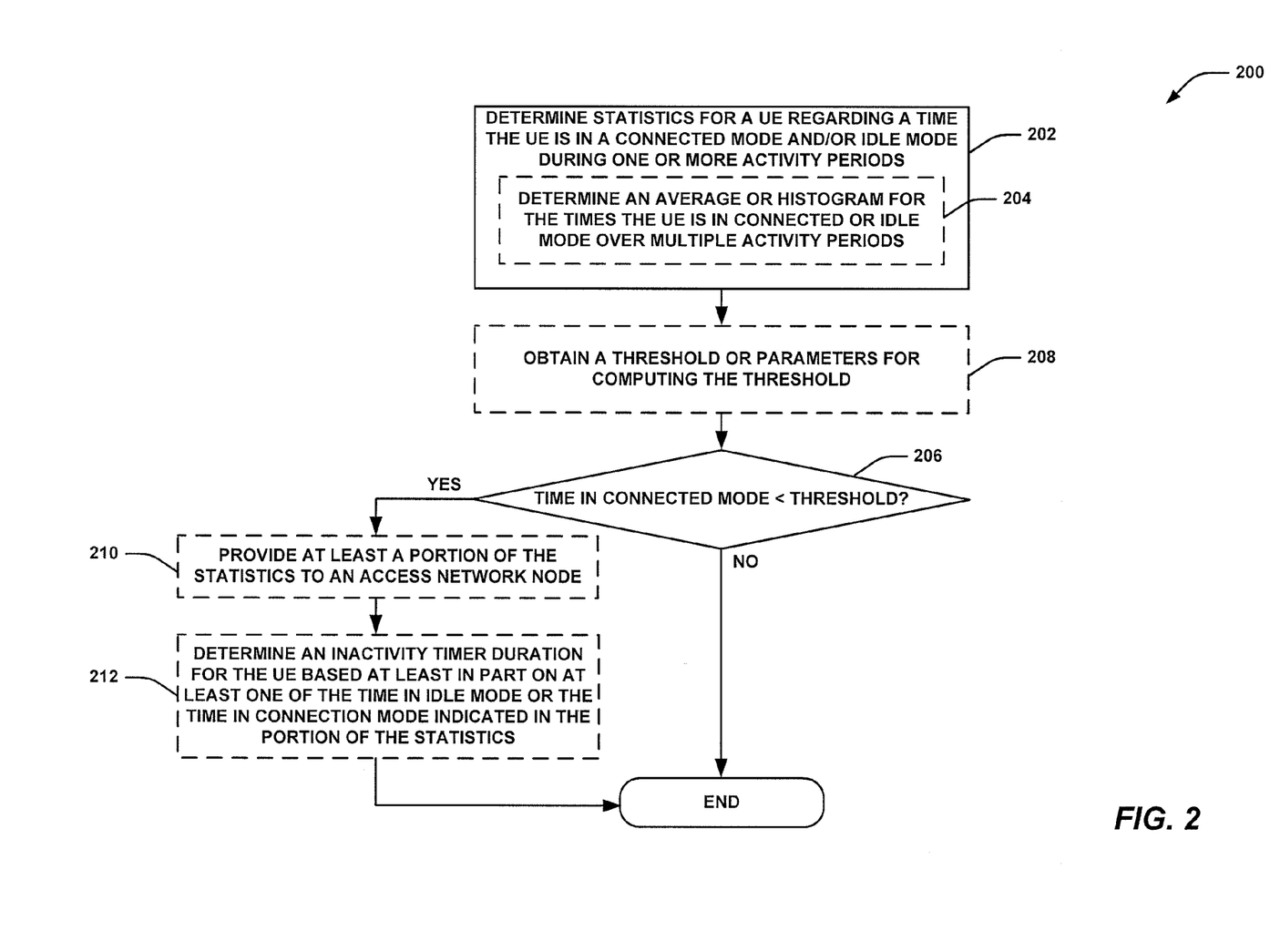
FIG. 2 is a flow diagram comprising a plurality of functional blocks representing an example method for determining statistics of a user equipment (UE) for computing an inactivity timer duration.
Figure 3:
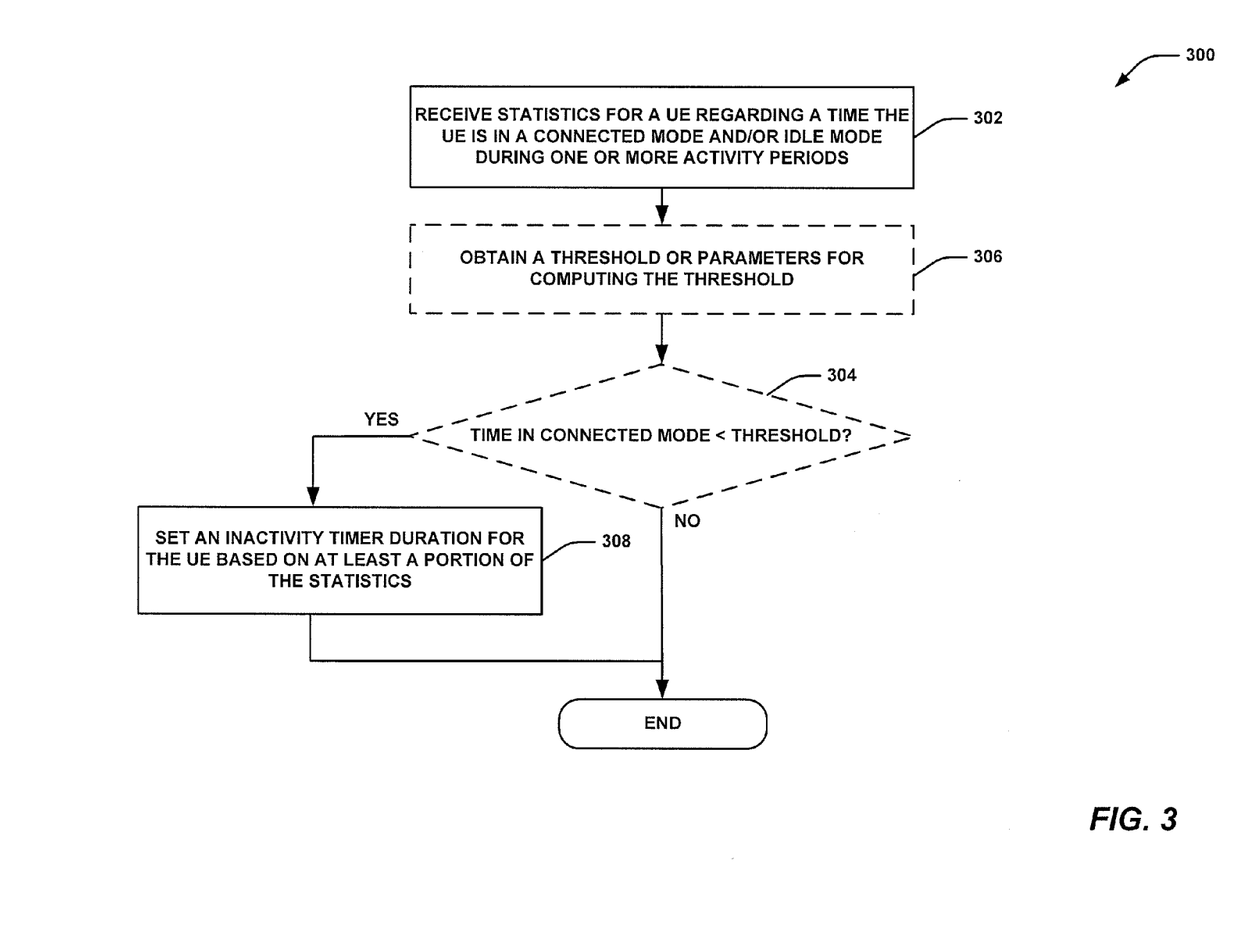
FIG. 3 is a flow diagram comprising a plurality of functional blocks representing an example method for determining statistics of a user equipment (UE) for computing an inactivity timer duration.

Referring to FIGS. 1-3, aspects are depicted with reference to one or more components and one or more methods that may perform the actions or functions described herein. In an aspect, the term "component" as used herein may be one of the parts that make up a system, may be hardware or software or some combination thereof, and may be divided into other components. Moreover, for example, a component described herein may be implemented in a specially-configured hardware element, such as a processor module, or as computer-executable code stored in a computer-readable medium and executable by a processor, or a combination of both, for example. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. FIG. 1 includes a UE 102 that communicates with an access network node 104 in a wireless network. The access network node 104 can communicate with the core network node 106 to provide the UE 102 with services related to wireless network access. Though one UE 102 and access network node 104 are shown, it is to be appreciated that multiple UEs 102 can communicate with an access network node 104, a UE 102 can communicate with multiple access network nodes 104, and/or the like, to access one or more core network nodes 106.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air (OTA) communication link using one or more OTA communication protocols described herein. Additionally, in some examples, UE 102 may be configured to facilitate communication on multiple separate networks via multiple separate subscriptions, multiple radio links, and/or the like. UE 102 can include UE 502 in FIG. 5, in one example.

Furthermore, access network node 104 may comprise one or more of any type of network module, such as an access point, a macro cell, including a base station (BS), node B, eNodeB (eNB), a relay, a peer-to-peer device, a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, access network node 104 may communicate with one or more other network entities of wireless and/or core networks, such as core network node 106. Access network node 104 may be or may include apparatus 400 of FIG. 4a and/or components thereof, eNodeB 506, other eNodeBs 508, or other components of an E-UTRAN 504 in FIG. 5, for example.

Figure 4A:
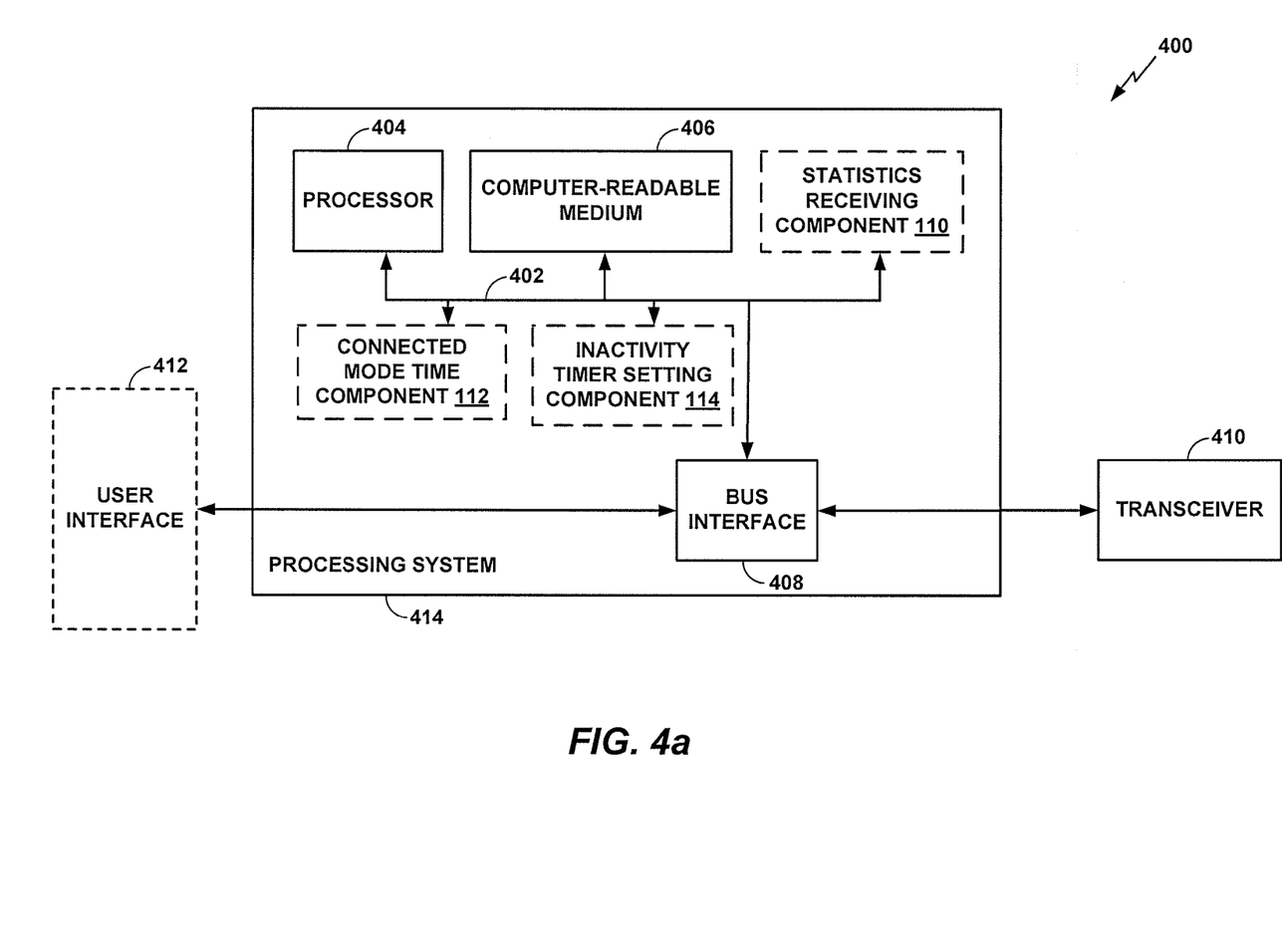
FIG. 4a is a diagram illustrating an example of a hardware implementation for an apparatus employing a processing system.
Figure 4B:
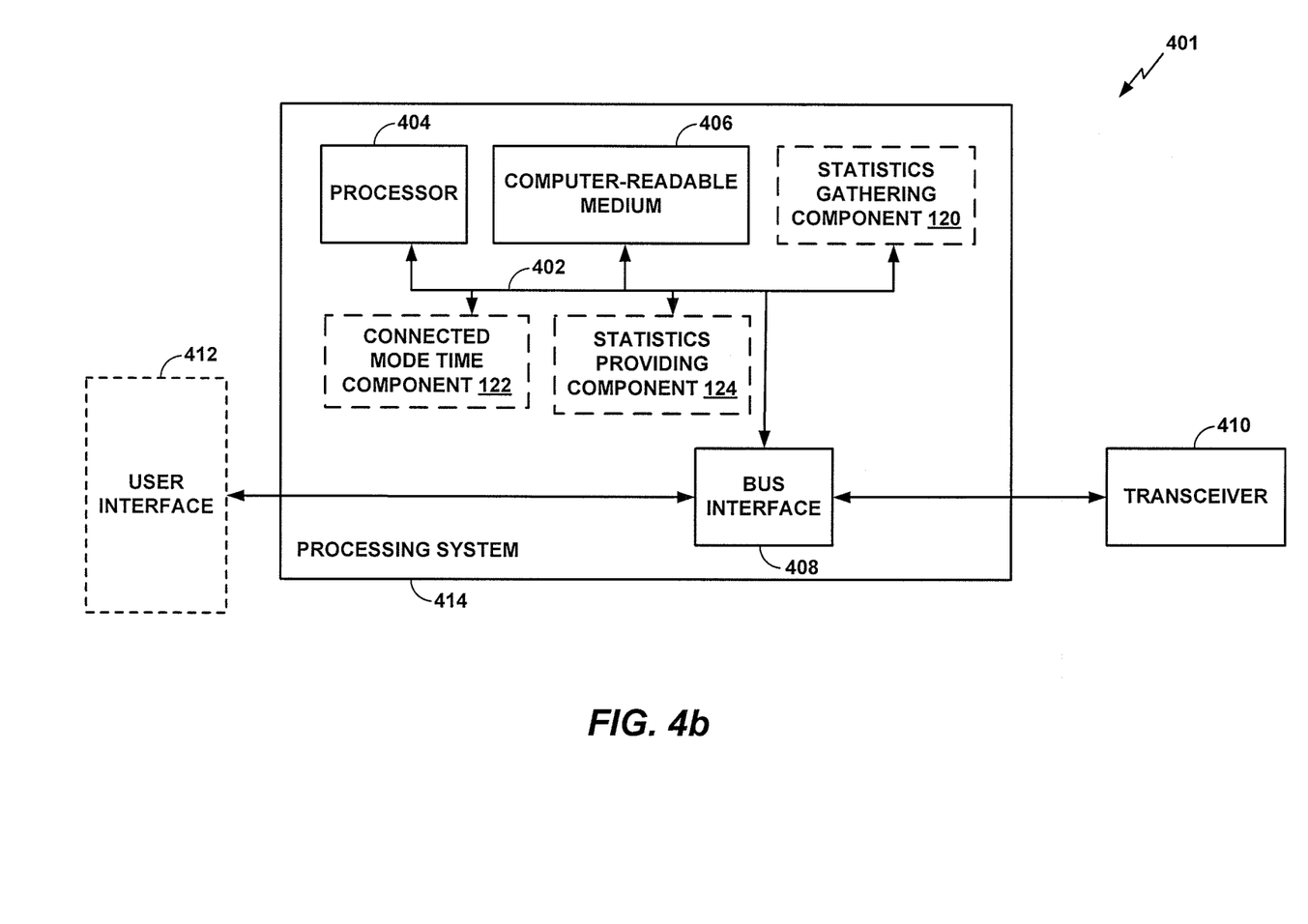
FIG. 4b is a diagram illustrating an example of a hardware implementation for an apparatus employing a processing system.

Core network node 106 can include an authentication, authorization and accounting (AAA) server, a mobile switching center (MSC), a mobility management entity (MME) (e.g., MME 512 or other MMEs 514 in FIG. 5), one or more serving gateways (SGW) (e.g., SGW 516 in FIG. 5) or packet data network (PDN) gateways (PGW) (e.g., PGW 518 in FIG. 5), an apparatus 401 of FIG. 4b, etc. Core network node 106 allows access network node 104 to communicate with a core wireless network to provide network access to one or more UEs. The core network can include an evolved packet core (EPC) (e.g., EPC 510 in FIG. 5) or similar networks that support one or more wireless communication technologies, as described further herein. For example, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, access network node 104) may be coupled to a core network via one or more wired or wireless connections (e.g., to core network node 106 and/or other intermediate or alternative nodes).

In an example, UE 102 can communicate with access network node 104 in a connected or idle mode, and times spent in connected or idle mode may be indicative of periods of activity or inactivity of the UE 102 in certain circumstances, or may not be in other circumstances. Access network node 104 may use these statistics (e.g., the time the UE 102 spent in connected and idle modes) in determining a duration value for an inactivity timer for the UE 102. The inactivity timer can relate to a period of time of detected inactivity that results in the access network node 104 switching the UE 102 from connected mode to idle mode communications (e.g., via radio resource control (RRC) command). In one example, core network node 106 can track the statistics and can provide the statistics to the access network node 104 when the time in connected mode is less than a threshold. In another example, the access network node 104 can receive the statistics from the core network node 106 and can determine whether to use the statistics based on determining whether the time in connected mode is less than a threshold.

Access network node 104 can include a statistics receiving component 110 for receiving statistics from core network node 106 related to times that a UE 102 is in connected mode and/or idle mode in communicating with the wireless network, an optional connected mode time component 112 for determining a connected mode time related to the statistics, and/or an inactivity timer setting component 114 for setting a duration value for an inactivity timer based at least in part on the statistics and/or the connected mode time related to the statistics.

Core network node 106 can include a statistics gathering component 120 for determining times during which a UE 102 is in connected and/or idle mode communications with the network, an optional connected mode time component 122 for determining a connected mode time related to the statistics, and/or a statistics providing component 124 for providing the statistics to one or more access network nodes 104, which may be based on the connected mode time related to the statistics.

In an example, statistics gathering component 120 can be configured to determine statistics related to a time a UE is in connected mode and a time the UE is in idle mode for one or more activity periods defined by the connected mode and idle mode times. For example, statistics gathering component 120 can determine $C_n$ as the length of the connected mode portion of the nth activity period, where n is the completed nth activity period where the UE 102 is in connected mode once and idle mode once, $I_n$ as the length of the idle mode portion of the nth activity period, and thus $P_n$ as the length of the nth activity period where $P_n = C_n + I_n$.

In addition, $$C_n = \sum_{i=1}^{K-1} A_{n-i} + a_{n-i} \text{ where } i > T \text{ for } i < K, a_{n-K} > T$$

$$I_n = a_{n-K} - T$$

where T is a duration of an inactivity timer for a given activity period, A is a period of actual activity by the UE 102 (e.g. by the RF resources of the UE 102), a is a period of actual inactivity by the UE 102, and K represents one or more periods of actual activity/inactivity where the period of inactivity is not as long as inactivity timer T. Generally, if a is small (e.g., less than a threshold such as 2 or 3 times the inactivity timer duration), then an eNB can decide to use a longer duration for the inactivity timer for a UE that covers a and keeps the UE connected. If a is long, then the eNB can determine that the UE goes into long periods of inactivity after being active and can thus use a smaller duration for the inactivity timer to keep the UE in idle mode.

Statistics gathering component 120, however, may not be able to determine K, and thus cannot determine A or a, because the core network node 106 may only be notified regarding the UE entering connected and idle mode, and not necessarily of periods of activity/inactivity at the UE. For example, the UE 102 may have a long series of short periods of inactivity, and then one long period of inactivity (e.g., K would be large), and the core network node 106 may only observe the long idle mode periods based on detecting associated expiration of the inactivity timer, which does not accurately reflect the inactivity statistics in this example. Conversely, where K is small (or equal to one), the statistics determined by core network node 106 may be more accurate (e.g., $C_n = A_n$ and $I_n = a_n - T$). The core network node 106, however, may not be able to determine when K=1 because the core network node 106 may not know the value of the inactivity timer. The core network node 106 may, however, consider K=1 when $C_n$ is small, as this lessens the likelihood of one or more periods of inactivity that are smaller than $C_n$. For example, in a scenario where $C_n$ is small (e.g., less than a threshold and thus K can be inferred as 1), and $I_n$ is large, this can be indicative of a pattern of small transmissions followed by large periods of inactivity, so the duration for the inactivity timer can be selected to be small. In a scenario where $C_n$ is small (e.g., less than a threshold and thus K can be inferred as 1), and $I_n$ is also small, this can result in frequent idle to connected mode transitions, and thus the duration for the inactivity timer can be selected to be larger to keep the UE in connected mode for a longer period of time to avoid the frequent transitions. Accordingly, aspects described herein can filter statistics determined for UE connected mode/idle mode times based at least in part on whether the connected mode time is less than a threshold.

FIG. 2 illustrates a method 200 for determining whether to provide UE statistics regarding times spent in connected and idle modes to an access network node. Method 200 includes, at Block 202, determining statistics for a UE regarding a time the UE is in a connected mode during one or more activity periods. Statistics gathering component 120 may determine the statistics for the UE regarding the time the UE is in connected mode (and/or idle mode) during the one or more activity periods. Statistics gathering component 120 may gather or otherwise determine statistics for the UE 102 by one or more of various operations including the collection, organization, analysis, and/or interpretation of data, for example. Additionally, an activity period can relate to substantially any measurable period of time that the UE 102 is connected to core network node 106 or other nodes of the core network via one or more access network nodes, including access network node 104. In one example, an activity period may be defined to include a cycle of times during which the UE 102 is connected to access network node 104 in one connected mode period and one adjacent idle mode period. Thus, for example, the activity period may be defined by the period of time when the UE initiates a connected mode until the UE switches to idle mode and then back to connected mode again, thus including a complete connected mode and adjacent idle mode period. It is to be appreciated that the access network node 104 can indicate to the core network node 106 when the UE 102 is in connected or idle mode, and statistics gathering component 120 can receive and track the times of connected and idle mode connectivity for the UE 102. In another example, statistics gathering component 120 can detect UE 102 in connected or idle mode based at least in part on whether one or more core network bearers are activated or deactivated for the UE 102 by the access network node 104, core network node 106, and/or other network nodes. In any case, statistics gathering component 120 can collect such statistics of the UE 102 over a single activity period or multiple activity periods.

Thus, in an example, determining statistics for the UE at Block 202 may optionally include, at Block 204, determining an average or histogram for the times the UE is in connected or idle mode over multiple activity periods. Statistics gathering component 120 can determine the average or histogram for the times the UE is in connected or idle mode over the multiple activity periods. For example, this can include computing a mean, median, etc. average of the times, a histogram of an estimate of probability distribution of the times, etc. In this regard, in an example, connected mode time component 122 may compare one or more of the averages, probability distributions, etc. to one or more thresholds to determine whether to include the statistics for providing to the access network node 104, as described further herein.

Method 200 also includes, at Block 206, determining (e.g., from the statistics or statistical information determined in Block 202) whether the time in connected mode is less than a threshold. Connected mode time component 122 can determine whether the time in connected mode is less than the threshold. It is to be appreciated that in other examples, connected mode time component 122 may alternatively determine whether the time is less than or equal to the threshold, greater than or greater than or equal to the threshold, etc. In any case, the threshold, for example, can be an absolute time value, a time value relative to a duration for an inactivity timer (e.g., the duration value of the inactivity timer itself, the value multiplied by a multiplier (e.g., 2× or 3×), etc.), a value relative to a time spent in idle mode in one or more activity periods (e.g., ½ the time spent in idle mode, etc.), and/or the like.

In one example, method 200 can optionally include, at Block 208, obtaining the threshold or parameters for computing the threshold. Connected mode time component 122 can obtain the threshold, and/or the one or more parameters for computing the threshold. For example, connected mode time component 122 may obtain the threshold and/or the one or more parameters in a core network configuration (e.g., specific to UE 102 or otherwise) from one or more other core network components (e.g., an operations and management (O&M) node or function of the core network), from the access network node 104 (e.g., based on a configuration at the access network node 104, detected conditions at the access network node 104 for the UE 102 or all UEs, etc.), and/or the like. In one example, connected mode time component 122 can obtain a duration of the inactivity timer related to the UE 102, and can compute the threshold as the duration multiplied by a factor, as described above. In another example, connected mode time component 122 can obtain parameters determined by the core network node 106, such as a time the UE 102 spent in idle mode (e.g. in the current and/or one or more prior activity periods), and can determine the threshold based on such parameters (e.g., a fraction of the time, as described above).

Moreover, where statistics gathering component 120 obtains statistics for multiple activity periods for consideration (e.g., and/or connected mode time component 122 computes an average or histogram times of the periods), connected mode time component 122 can determine whether the time in connected mode is less than a threshold by determining whether a computed probability of the time in connected mode during the activity periods being less than the threshold time achieves a threshold probability, as described. In addition, in another example, where multiple activity periods are considered, connected mode time component 122 can determine whether the time in connected mode is less than a threshold for each of the multiple activity periods.

Where the time in connected mode is less than the threshold, method 200 optionally includes, at Block 210, providing at least a portion of the statistics to an access network node. Statistics providing component 124 can provide at least the portion of the statistics to the access network node 104 (where connected mode time component 122 determines the connected mode time related to the statistics is less than the threshold). Statistics receiving component 110, in this example, can receive the statistics from the core network node 106, and inactivity timer setting component 114 can use the statistics in determining a duration value for the inactivity timer for the UE 102. Using the statistics from the core network node 106 only for activity periods having connected times less than the threshold allows for a more accurate representation of the activity/inactivity time for the UE 102 during the activity period, as described. For example, because the connected mode time is small (e.g., less than the threshold), the time the UE 102 spent in idle mode as determined by the core network node 106 may more accurately represent the time period of actual inactivity of the UE 102 as compared to when the connected mode time is larger and more periods of actual inactivity may occur that are not large enough in duration to cause the inactivity timer to expire. In addition, in an example where multiple activity periods are considered, statistics providing component 124 can provide statistics of those activity periods having a connected mode time less than the threshold to the access network node and/or may provide the statistics for all of the multiple activity periods where an average or probability distribution of the times are less than the threshold.

Moreover, in another example where the time in connected mode is less than the threshold, method 200 optionally includes, at Block 212, determining an inactivity timer duration for the UE based at least in part on at least one of the time in idle mode or the time in connected mode indicated in the portion of the statistics. Statistics providing component 124 can determine the inactivity timer duration for the UE based at least in part on at least one of the time in idle mode or the time in connected mode indicated in the portion of the statistics. In this example, statistics providing component 124 can also provide the inactivity timer duration to the access network node 104. Thus, for example, statistics receiving component 110 can receive the inactivity timer duration, and inactivity timer setting component 114 can use the inactivity timer duration for the UE 102.

FIG. 3 illustrates another example method 300 for determining statistics to use in setting a duration for an inactivity timer for a UE. Method 300 includes, at Block 302, receiving statistics for a UE regarding a time the UE is in a connected mode and/or idle mode during one or more activity periods. Access network node 104 (FIG. 1) includes a statistics receiving component 110 for receiving statistics for the UE 102 regarding a time the UE 102 is in connected mode and/or idle mode during one or more activity periods. For example, statistics receiving component 110 may receive such statistics from a core network node 106. As described, the statistics gathering component 120 can collect such statistics regarding a time the UE 102 spent in connected and idle modes of an activity period (e.g., a cycle of one connected mode and one idle mode). In this example, core network node 106 may or may not include a connected mode time component 122 for determining whether to report statistics to the access network node 104 based on the connected time of the activity period, and thus may report substantially available statistics without regard to the connected times. In any case, statistics providing component 124 provides the statistics to the access network node 104, and statistics receiving component 110 can obtain the statistics for the UE 102. In any case, statistics receiving component 110 may receive such statistics of the UE 102 for a single activity period or multiple activity periods. In one example, statistics received from statistics gathering component 120 for multiple activity periods may correspond to an average or histogram or probability distribution of the statistics over the multiple activity periods.

Method 300 also optionally includes, at Block 304, determining (e.g., from the statistics or statistical information received in Block 302) whether the time in connected mode for the statistics is less than a threshold. Connected mode time component 112 can determine whether the time in connected mode is less than the threshold. It is to be appreciated that in other examples, connected mode time component 112 may alternatively determine whether the time is less than or equal to the threshold, greater than or greater than or equal to the threshold, etc. In any case, the threshold, for example, can be an absolute time value, a time value relative to a duration for an inactivity timer (e.g., the duration value of the inactivity timer itself, the value multiplied by a multiplier (e.g., 2× or 3×), etc.), a value relative to a time spent in idle mode in one or more activity periods (e.g., ½ the time spend in idle mode, etc.), and/or the like.

In one example, method 300 can optionally include, at Block 306, obtaining the threshold or parameters for computing the threshold. Connected mode time component 112 can obtain the threshold, and/or the one or more parameters for computing the threshold. For example, connected mode time component 112 may obtain the threshold and/or the one or more parameters in a core network configuration (e.g., specific to UE 102 or otherwise) from core network node 106 and/or one or more other core network components (e.g., an operations and management (O&M) node or function of the core network), etc. In another example, connected mode time component 112 may determine the threshold based at least in part on detecting conditions (e.g., radio conditions) at the access network node 104 for the UE 102 or all UEs, etc. In one example, connected mode time component 112 can obtain a duration of the inactivity timer related to the UE 102, and can compute the threshold as the duration multiplied by a factor, as described above. In another example, connected mode time component 112 can obtain parameters determined by the core network node 106, such as a time the UE 102 spent in idle mode (e.g. in the current and/or one or more prior activity periods), and can determine the threshold based on such parameters (e.g., a fraction of the time, as described above).

Moreover, as described, where multiple activity periods are considered (e.g., an average or histogram of probability distribution of the times of the periods), connected mode time component 112 can determine whether the time in connected mode is less than a threshold by determining whether a computed probability of the time in connected mode during the activity periods being less than the threshold time achieves a threshold probability, as described. In addition, in another example, where multiple activity periods are considered, connected mode time component 112 can determine whether the time in connected mode is less than a threshold for each of the multiple activity periods.

Method 300 further includes, at Block 308, setting an inactivity timer duration for the UE based on at least a portion of the statistics. Access network node 104 includes an inactivity timer setting component 114 for setting the inactivity timer duration for the UE 102 based on at least the portion of the statistics. For example, inactivity timer setting component 114 may set the inactivity timer duration based on an indicated idle mode in the activity periods where the connected mode time is determined as less than a threshold (e.g., whether the connected mode time is determined as less than the threshold by connected mode time component 122 (e.g., as in Block 206 of method 200) and/or by connected mode time component 112, as described in reference to Block 304 above. For example, the longer the time spent in idle mode in the activity period for the UE 102, the shorter inactivity timer setting component 114 may set the inactivity timer duration (e.g., as a detected period of inactivity is more likely to result in a long period of inactivity), and/or vice versa, as described above. The relationship between idle mode time statistics and setting related inactivity timer durations may be defined in a mapping or function provisioned to the access network node 104 in a configuration (e.g., from the core network or otherwise stored by the access network node 104), and/or may be based on one or more detected conditions of the access network node 104, UE 102, and/or the like.

FIG. 4a is a conceptual diagram illustrating an example of a hardware implementation for an apparatus 400 employing a processing system 414. In some examples, the processing system 414 may comprise a UE or a component of a UE (e.g., UE 102 of FIG. 1), an access network node (e.g., access network node 104 of FIG. 1), etc. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and optionally statistics receiving component 110, connected mode time component 112, inactivity timer setting component 114 or other components of an access network node 104, etc. (FIG. 1), which may be configured to carry out one or more methods or procedures described herein (e.g., method 300 in FIG. 3). In some instances, at least some of the operations of components 110, 112, and 114, or of other components described above and/or in FIG. 1 may be implemented or performed by the processor 404 using information and/or instructions stored in the computer-readable medium 406.

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

FIG. 4b is a conceptual diagram illustrating an example of a hardware implementation for an apparatus 401 employing a processing system 414. In some examples, the processing system 414 may comprise a component of a core network, such as an MME, SGW/PGW, etc. (e.g., core network node 106). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and optionally statistics gathering component 120, connected mode time component 122, statistics providing component 124 or other components of a core network node 106, etc. (FIG. 1), which may be configured to carry out one or more methods or procedures described herein (e.g., method 200 in FIG. 2). In some instances, at least some of the operations of components 120, 122, and 124, or of other components described above and/or in FIG. 1 may be implemented or performed by the processor 404 using information and/or instructions stored in the computer-readable medium 406.

Figure 5:
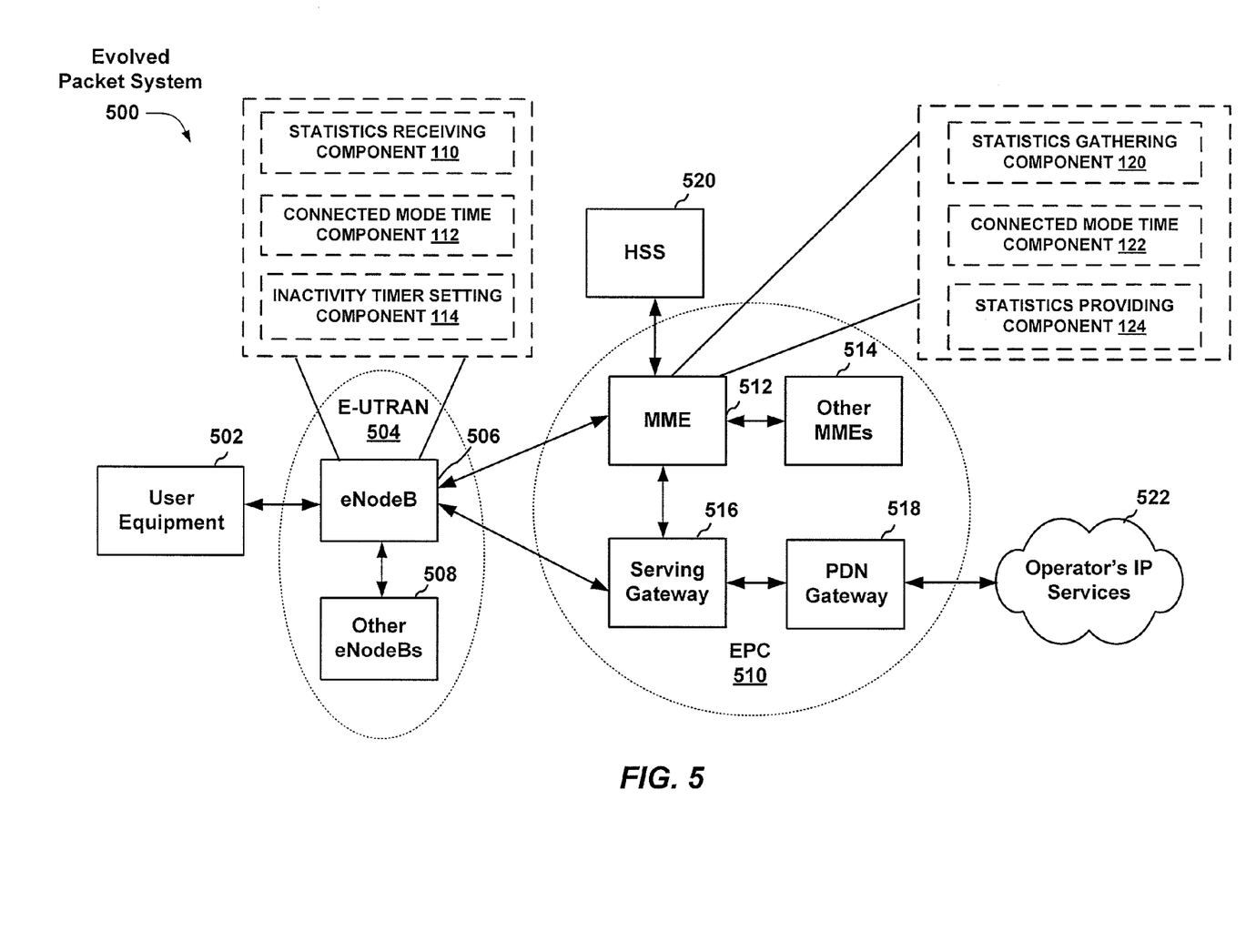
FIG. 5 is a block diagram conceptually illustrating an example of an LTE telecommunications system.

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium, which can include apparatuses of a core network, such as an EPC 510 (FIG. 5). Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

FIG. 5 is a diagram illustrating an LTE network architecture 500 employing various apparatuses (e.g., UE 102, access network node 104, core network node 106 of FIG. 1). The LTE network architecture 500 may be referred to as an Evolved Packet System (EPS) 500. The EPS 500 may include one or more user equipment (UE) 502 (which may represent UE 102 of FIG. 1), an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508, one or more of which may represent access network node 104 of FIG. 1. Accordingly, for example, eNB 506 (and/or eNB 508) may include one or more of a statistics receiving component 110, connected mode time component 112, and/or inactivity timer setting component 114, as described herein, which may carry out various functions and/or methods described herein (e.g., method 300 in FIG. 3). The eNB 506 provides user and control plane protocol terminations toward the UE 502. The eNB 506 may be connected to the other eNBs 508 via an X2 interface (i.e., backhaul). The eNB 506 may also be referred to by those skilled in the art as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S1 interface to the EPC 510. The EPC 510 includes a Mobility Management Entity (MME) 512, other MMEs 514, a Serving Gateway 516, and a Packet Data Network (PDN) Gateway 518, which may correlate to core network node 106 of FIG. 1. Thus, for example, the MME 512 (or other MMEs 514 or other core network components) may include one or more of a statistics gathering component 120, connected mode time component 122, and/or statistics providing component 124, as described herein, which may carry out various functions and/or methods described herein (e.g., method 200 in FIG. 2). The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 include the Internet, the Intranet, an IP Multimedia Subsystem (IMS), and a PS Streaming Service (PSS).

Figure 6:
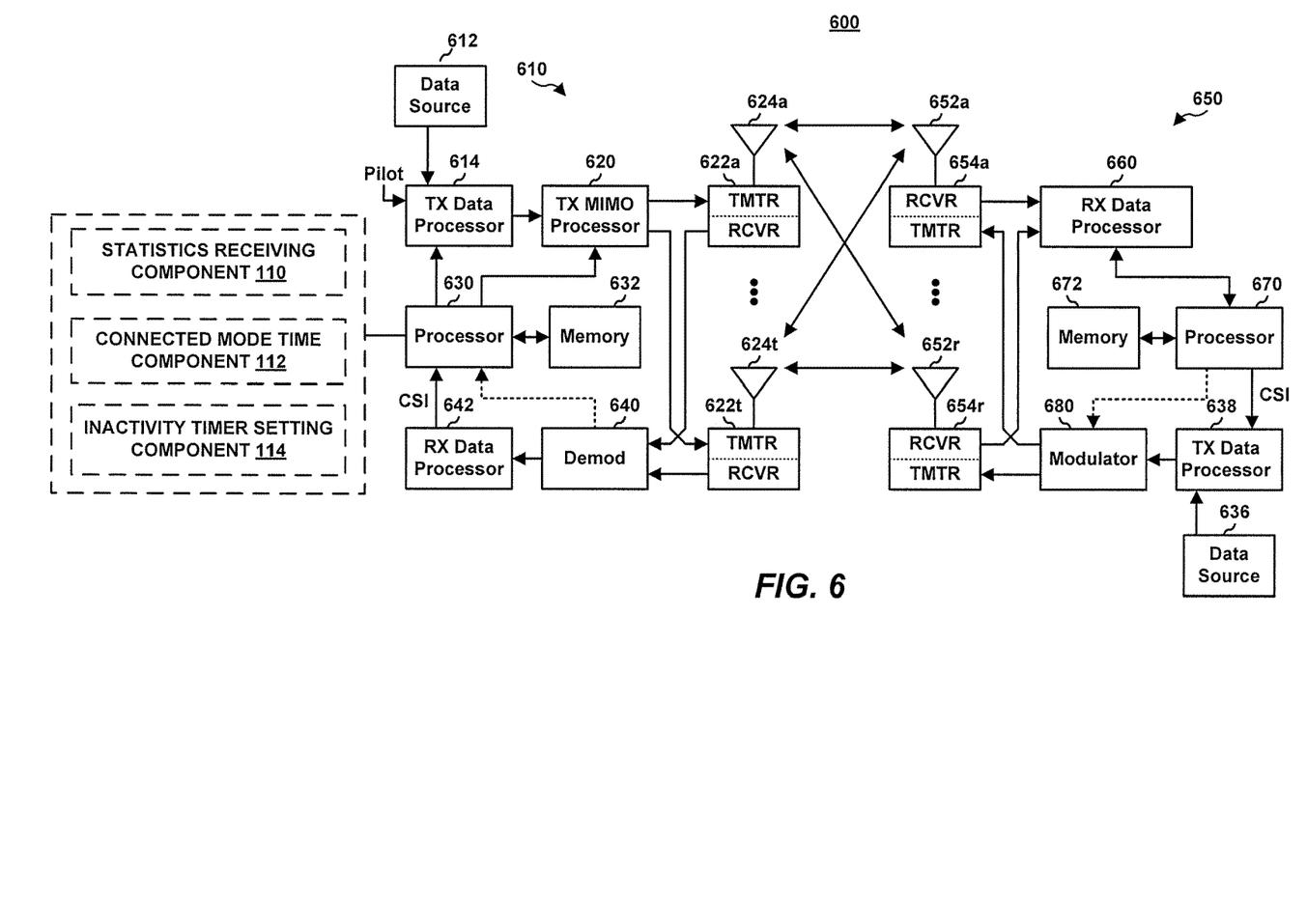
FIG. 6 is a diagram illustrating an example of an evolved Node B and user equipment in an access network.

FIG. 6 is a block diagram of an embodiment of a transmitter system 610 (e.g., an access point or eNB, such as access network node 104 in FIG. 1) and a receiver system 650 (e.g., an access terminal or UE, such as UE 102 in FIG. 1) in a MIMO system 600. At the transmitter system 610, traffic data for a number of data streams is provided from a data source 612 to a transmit (TX) data processor 614. In addition, it is to be appreciated that transmitter system 610 and/or receiver system 650 can employ or can be part of the systems/apparatuses (e.g., FIGS. 1, 4a, 4b, etc.) and/or methods (FIGS. 2 and 3) described herein to facilitate wireless communication there between. For example, components or functions of the systems and/or methods described herein can be part of a memory 632 and/or 672 or processors 630 and/or 670 described below, and/or can be executed by processors 630 and/or 670 to perform the disclosed functions.

In an example, transmitter system 610 may include an eNB, and may thus include one or more of a statistics receiving component 110, connected mode time component 112, and/or inactivity timer setting component 114, as described herein. The components 110, 112, and/or 114 may be communicatively coupled with one or more processors 630 for executing functions associated with the components 110, 112, and/or 114, as described herein (e.g., in FIGS. 1, 4a, etc.), such to perform method 300 (FIG. 3), etc., and/or to receive statistics from a core network node 106 for determining an inactivity timer duration.

In an embodiment, each data stream is transmitted over a respective transmit antenna. TX data processor 614 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 630.

The modulation symbols for all data streams are then provided to a TX MIMO processor 620, which can further process the modulation symbols (e.g., for OFDM). TX MIMO processor 620 then provides NT modulation symbol streams to NT transmitters (TMTR) 622a through 622t. In certain embodiments, TX MIMO processor 620 applies beamforming weights to the symbols of the data streams and to the antenna from which the symbol is being transmitted.

Each transmitter 622 receives and processes a respective symbol stream to provide one or more analog signals, and further conditions (e.g., amplifies, filters, and upconverts) the analog signals to provide a modulated signal suitable for transmission over the MIMO channel NT modulated signals from transmitters 622a through 622t are then transmitted from NT antennas 624a through 624t, respectively.

At receiver system 650, the transmitted modulated signals are received by NR antennas 652a through 652r and the received signal from each antenna 652 is provided to a respective receiver (RCVR) 654a through 654r. Each receiver 654 conditions (e.g., filters, amplifies, and downconverts) a respective received signal, digitizes the conditioned signal to provide samples, and further processes the samples to provide a corresponding "received" symbol stream.

An RX data processor 660 then receives and processes the NR received symbol streams from NR receivers 654 based on a particular receiver processing technique to provide NT "detected" symbol streams. The RX data processor 660 then demodulates, deinterleaves, and decodes each detected symbol stream to recover the traffic data for the data stream. The processing by RX data processor 660 is complementary to that performed by TX MIMO processor 620 and TX data processor 614 at transmitter system 610.

A processor 670 periodically determines which pre-coding matrix to use. Processor 670 formulates a reverse link message comprising a matrix index portion and a rank value portion.

The reverse link message can comprise various types of information regarding the communication link and/or the received data stream. The reverse link message is then processed by a TX data processor 638, which also receives traffic data for a number of data streams from a data source 636, modulated by a modulator 680, conditioned by transmitters 654a through 654r, and transmitted back to transmitter system 610.

At transmitter system 610, the modulated signals from receiver system 650 are received by antennas 624, conditioned by receivers 622, demodulated by a demodulator 640, and processed by a RX data processor 642 to extract the reserve link message transmitted by the receiver system 650. Processor 630 then determines which pre-coding matrix to use for determining the beamforming weights then processes the extracted message.

Processors 630 and 670 can direct (e.g., control, coordinate, manage, etc.) operation at transmitter system 610 and receiver system 650, respectively. Respective processors 630 and 670 can be associated with memory 632 and 672 that store program codes and data. For example, processors 630 and 670 can perform functions described herein with respect to UE 102, access network node 104, core network node 106, etc., and/or can operate one or more of the corresponding components. Similarly, memory 632 and 672 can store instructions for executing the functionality or components, and/or related data.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of reporting user equipment (UE) activity period statistics, comprising:
   obtaining, from an access network node, parameters for computing a threshold, wherein the parameters for computing the threshold comprise an inactivity timer duration;
   computing the threshold as the inactivity timer duration multiplied by a multiplier;
   determining statistics for a UE regarding a time the UE is in a connected mode or idle mode during one or more activity periods;
   determining, from the statistics for the UE, whether the time the UE is in the connected mode in the one or more activity periods is less than the threshold;
   where the time the UE is in the connected mode is determined to be less than the threshold:
      providing at least a portion of the statistics for the UE to the access network node; and
      determining the inactivity timer duration for the UE based at least in part on at least one of the time the UE is in idle mode or the time the UE is in the connected mode as indicated in the statistics; and
   where the time the UE is in the connected mode is not determined to be less than the threshold:
      discarding at least a portion of the statistics.

2. The method of claim 1, wherein determining the statistics comprises determining an average or histogram of a probability distribution of the time the UE is in connected mode or idle mode over multiple activity periods, wherein the one or more activity periods comprise the multiple activity periods.

3. The method of claim 2, wherein determining whether the time the UE is in the connected mode is less than the threshold comprises determining whether the average or the probability distribution of the time is less than the threshold.

4. The method of claim 1, wherein obtaining the parameters for computing the threshold comprises obtaining the parameters from a core network configuration.

5. The method of claim 1, wherein obtaining the parameters for computing the threshold comprises obtaining the parameters from a core network component.

6. The method of claim 5, wherein the core network component includes an operations and management node or function.

7. The method of claim 1, wherein computing the threshold further comprises computing the threshold as a fraction of the time the UE is in idle mode during the one or more activity periods.

8. An apparatus for reporting user equipment (UE) activity period statistics, comprising:
   a memory; and
   at least one processor coupled to the memory, wherein the at least one processor is configured to:
      obtain, from an access network node, parameters for computing a threshold, wherein the parameters for computing the threshold comprise an inactivity timer duration;
      compute the threshold as the inactivity timer duration multiplied by a multiplier;
      determine statistics for a UE regarding a time the UE is in a connected mode or idle mode during one or more activity periods;
      determine, from the statistics for the UE, whether the time the UE is in the connected mode in the one or more activity periods is less than a threshold;
      where the time the UE is in the connected mode is determined to be less than the threshold:
         provide at least a portion of the statistics for the UE to the access network node; and
         determine the inactivity timer duration for the UE based at least in part on at least one of the time the UE is in idle mode or the time the UE is in the connected mode as indicated in the statistics; and
      where the time the UE is in the connected mode is not determined to be less than the threshold:
         discard at least a portion of the statistics.

9. The apparatus of claim 8, wherein the at least one processor is configured to determine an average or histogram of a probability distribution of the time the UE is in connected mode or idle mode over multiple activity periods, wherein the one or more activity periods comprise the multiple activity periods.

10. The apparatus of claim 9, wherein the at least one processor is configured to determine whether the time the UE is in the connected mode is less than the threshold based at least in part on determining whether the average or the probability distribution of the time is less than the threshold.

11. The apparatus of claim 8, wherein the at least one processor is configured to obtain the parameters for computing the threshold, from a core network configuration.

12. The apparatus of claim 8, wherein the at least one processor is configured to obtain the parameters for computing the threshold, from a core network component.

13. The apparatus of claim 12, wherein the core network component includes an operations and management node or function.

14. The apparatus of claim 8, wherein the at least one processor is configured to compute the threshold as a fraction of the time the UE is in idle mode during the one or more activity periods.

15. An apparatus for reporting user equipment (UE) activity period statistics, comprising:
   means for obtaining, from an access network node, parameters for computing a threshold, wherein the parameters for computing the threshold comprise an inactivity timer duration;
   means for computing the threshold as the inactivity timer duration multiplied by a multiplier;
   means for determining statistics for a UE regarding a time the UE is in a connected mode or idle mode during one or more activity periods;
   means for determining, from the statistics for the UE, whether the time the UE is in the connected mode in the one or more activity periods is less than a threshold;
   where the time the UE is in the connected mode is determined to be less than the threshold:
      means for providing at least a portion of the statistics for the UE to the access network node; and
      means for determining the inactivity timer duration for the UE based at least in part on at least one of the time the UE is in idle mode or the time the UE is in the connected mode as indicated in the statistics; and
   where the time the UE is in the connected mode is not determined to be less than the threshold:
      means for discarding at least a portion of the statistics.

16. The apparatus of claim 15, wherein the means for determining the statistics for the UE determines an average or histogram of a probability distribution of the time the UE is in connected mode or idle mode over multiple activity periods, wherein the one or more activity periods comprise the multiple activity periods.

17. The apparatus of claim 16, wherein the means for determining whether the time the UE is in the connected mode in the one or more activity periods is less than the threshold determines whether the average or the probability distribution of the time is less than the threshold.

18. The apparatus of claim 15, wherein the means for obtaining the parameters for computing the threshold obtains the parameters from a core network configuration.

19. The apparatus of claim 15, wherein the means for obtaining the parameters for computing the threshold obtains the parameters from a core network component.

20. The apparatus of claim 19, wherein the core network component includes an operations and management node or function.

21. The apparatus of claim 15, wherein the means for computing computes the threshold as a fraction of the time the UE is in idle mode during the one or more activity periods.

22. A non-transitory computer-readable medium comprising code for reporting user equipment (UE) activity period statistics, the code comprising:
    code for obtaining, from an access network node, parameters for computing a threshold, wherein the parameters for computing the threshold comprise an inactivity timer duration;
    code for computing the threshold as the inactivity timer duration multiplied by a multiplier;
    code for determining statistics for a UE regarding a time the UE is in a connected mode or idle mode during one or more activity periods;
    code for determining, from the statistics for the UE, whether the time the UE is in the connected mode in the one or more activity periods is less than a threshold;
    where the time the UE is in the connected mode is determined to be less than the threshold:
        code for providing at least a portion of the statistics for the UE to the access network node; and
        code for determining the inactivity timer duration for the UE based at least in part on at least one of the time the UE is in idle mode or the time the UE is in the connected mode as indicated in the statistics; and
    where the time the UE is in the connected mode is not determined to be less than the threshold:
        code for discarding at least a portion of the statistics.

23. The non-transitory computer-readable medium of claim 22, wherein the code for determining the statistics for the UE determines an average or histogram of a probability distribution of the time the UE is in connected mode or idle mode over multiple activity periods, wherein the one or more activity periods comprise the multiple activity periods.

24. The non-transitory computer-readable medium of claim 23, wherein the code for determining whether the time the UE is in the connected mode in the one or more activity periods is less than the threshold determines whether the average or the probability distribution of the time is less than the threshold.

25. The non-transitory computer-readable medium of claim 22, wherein the means for obtaining the parameters for computing the threshold obtains the parameters from a core network configuration.

26. The non-transitory computer-readable medium of claim 22, wherein the means for obtaining the parameters for computing the threshold obtains the parameters from a core network component.

27. The non-transitory computer-readable medium of claim 26, wherein the core network component includes an operations and management node or function.

28. The non-transitory computer-readable medium of claim 22, wherein the means for computing computes the threshold as a fraction of the time the UE is in idle mode during the one or more activity periods.

* * * * *